Sept. 27, 1966

S. H. ROTHROCK 3,275,853

WAVE TRANSLATING DEVICE FOR PRODUCING SHORT DURATION PULSES

Filed Nov. 6, 1964

INVENTOR
S. H. ROTHROCK
BY [signature]
ATTORNEY

United States Patent Office 3,275,853
Patented Sept. 27, 1966

3,275,853

WAVE TRANSLATING DEVICE FOR PRODUCING SHORT DURATION PULSES

Stanley H. Rothrock, Gillette, N.J., assignor to Bell Telephone Laboratories, Incorporated, New York, N.Y., a corporation of New York Filed Nov. 6, 1964, Ser. No. 409,414
5 Claims. (Cl. 307—88.5)

This invention relates to electrical waveform generating systems and, more particularly although in its broader aspects not exclusively, to an arrangement for generating pulses of the type employed in digital information handling systems.

In order for data processing and digital communication systems to operate with the high speed and capacity often desired, extremely high pulse repetition must be employed, both in the information carrying channels and in the control circuitry. It is accordingly necessary to use pulse generators, often in large numbers, which are capable of producing pulses of extremely short duration.

It is therefore a principal object of this invention to generate such short duration pulses in a manner which requires neither complex circuitry nor precision components.

In a principal aspect, the present invention takes the form of a wave translating device which converts an input "step" wave (that is, a waveform which manifests a shift from a first voltage level to a second and different level) into an output pulse. The arrangement includes a pulse forming network which, in its simplest form, may be a single capacitor. This pulse forming network is serially connected with the control current path of a switching transistor across the source of the input waveform. A bypass circuit connected in parallel with the control current path allows the pulse forming network to be charged while the input waveform is at the first voltage level. When the input waveform shifts to the second level, the net voltage across the control current path of the transistor turns the transistor ON and allows the pulse forming network to discharge through the transistor's transconductive path to form an output pulse.

The bypass circuit preferably comprises a diode connected to present a low impedance to the flow of charging current to the pulse forming network. This enables the pulse forming network to be rapidly charged as well as discharged such that extremely high pulse repetition rates may be achieved. A length of delay cable is particularly suited for use as a pulse forming network where pulse widths of accurate duration are desired. Using only a small number of conventional components, the present invention is capable of generating pulses of nanosecond duration at extremely high pulse repetition rates.

These and other objects, features and advantages of the present invention may be more clearly understood by considering the following detailed description. In the text of this description, reference will be made to the accompanying drawings in which.

Figure 1:
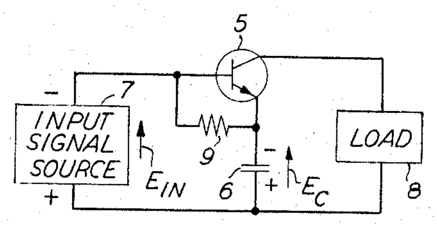
FIG. 1 shows a simplified embodiment of the present invention.

The simplified illustrative embodiment of the invention shown in FIG. 1 of the drawings includes a transistor 5 and a capacitor 6. The base-emitter or "control current" path of the transistor 5 is serially connected with the capacitor 6 across the terminals of an input signal source 7. The collector-emitter or "transconductive" path of transistor 5 is also connected in series with the capacitor 6 across a load circuit 8. A resistive bypass circuit 9 is connected in parallel with the control current path of the transistor 5.

Figure 2:
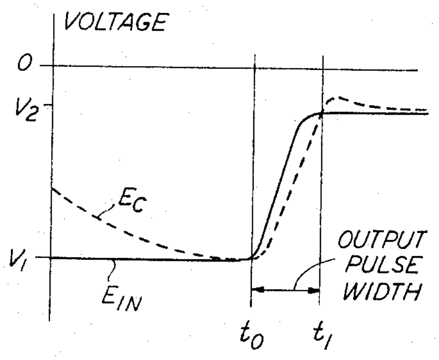
FIG. 2 depicts the input voltage and capacitor voltage waveforms for the illustrative circuit of FIG. 1.

The operation of the circuit shown in FIG. 1 is illustrated by the waveforms shown in FIG. 2. The input signal $E_{in}$ from source 7, shown by the solid line in FIG. 2, shifts from an initial voltage level $V_1$ to a subsequent level $V_2$. Before time $t_0$, while the input voltage $E_{in}$ is at level $V_1$, the capacitor 6 is charged through the bypass circuit 9 as illustrated by the dotted line segment in FIG. 2.

At the time $t_0$, when the input waveform begins its shift to the less negative voltage level $V_2$, the base of transistor 5 becomes positive with respect to the emitter voltage and transistor 5 is turned ON. Capacitor 6 is thus allowed to discharge through load 8 and the transconductive path of transistor 5. This output pulse continues until the capacitor 6 has discharged to a voltage level less than $V_2$.

Figure 3:
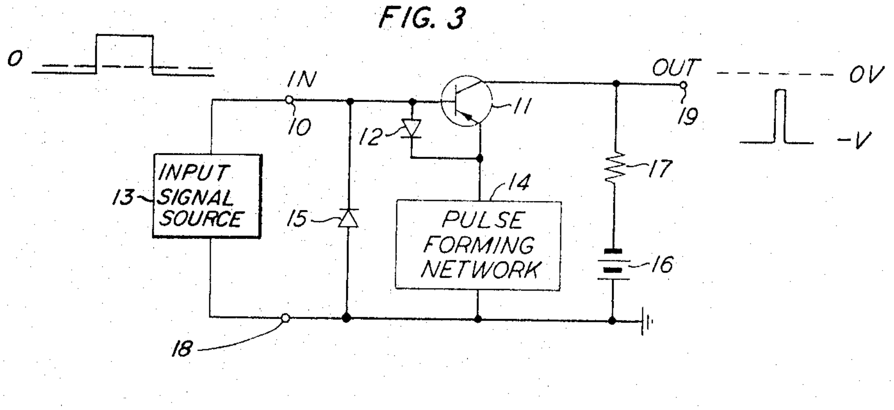
FIG. 3 shows a more detailed embodiment of the present invention using a bypass diode to permit rapid charging of the pulse forming network.

FIG. 3 of the drawings illustrates an embodiment of the invention which is capable of operation as a pulse shortener at very high pulse repetition rates. Positive-going input pulses from a source 13 are applied to an input terminal 10 which is directly connected to the base electrode of a transistor 11. Negative terminal 18 of source 13 is grounded. A bypass diode 12 is connected between the base and emitter of transistor 11 and is poled to bypass current around the base-emitter junction of transistor 11 when that junction is reverse biased. A pulse forming network 14, which may take a variety of forms, is connected between the emitter of transistor 11 and ground. A clamping diode 15 is conected between input terminal 10 and ground. The series combination of a source of operating potential 16 and a load resistance 17 is connected between ground and the collector of transistor 11. The output terminal 19 is directly connected to the collector of transistor 11.

The normally negative input voltage applied to terminal 10 is prevented from turning ON transistor 11 by the clamping diode 15 which limits its magnitude to a small value. When the input timing wave goes positive, the pulse forming network 14 is charged through diode 12. Diode 15 is reverse biased during this interval. The transistor 11 remains OFF as the base and emitter potentials rise together. When the input wave goes negative once again, the base of transistor 11 becomes more negative than the emitter due to the stored charge in pulse forming network 14. An output pulse is accordingly generated in the manner discussed in conjunction with FIG.2.

The use of the diode 12 permits the pulse forming network to be rapidly charged after each cycle of operation. The arrangement shown in FIG. 3 is accordingly capable of operation at high pulse repetition rates. The use of the source 16 provides pulses of greater amplitude as well as increasing the discharge rate of the pulse forming network. A variety of pulse forming networks may be employed, depending upon the duration and shape of the output pulse desired. Design considerations for such networks are disclosed in pages 175-221 of Volume 5, Pulse Generators, Radiation Laboratory Series, McGraw-Hill (1948).

Figure 4:
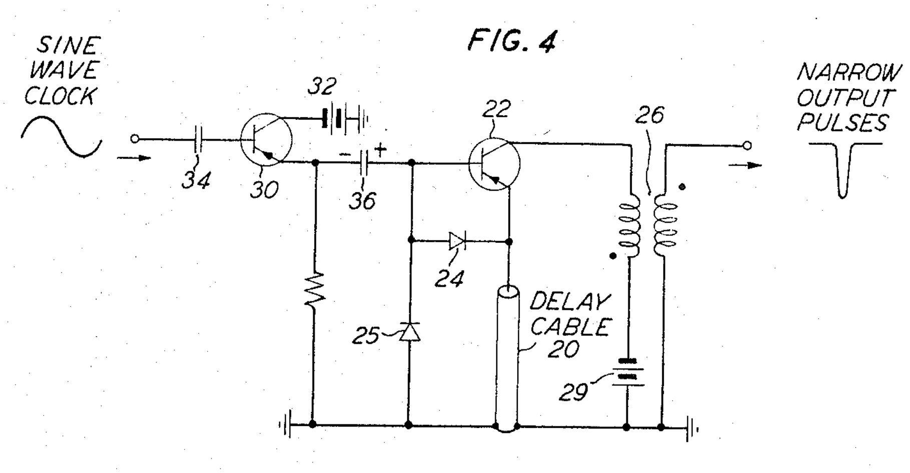
FIG. 4 shows still another illustrative embodiment of the invention employing an emitter follower input stage to provide ample charging current for the pulse forming delay cable.

FIG. 4 of the drawings illustrates a further embodiment of the invention for converting a sinusoidal clocking signal into a train of very short duration output pulses. A delay cable 20, which is connected between ground and the emitter electrode of transistor 22, is used as the pulse forming network. A bypass diode 24 is connected in parallel with the control current path of transistor 22 and a clamping diode 25 is connected between ground and the base of transistor 22. The primary winding 26 of an output pulse transformer is connected in series with voltage source 29 between ground and the collector of transistor 22.

In order to insure adequate charging current for the delay cable 20, a transistor emitter-follower driving stage is employed. This stage includes a transistor 30 whose transconductive path is connected in series between ground and a source of a negative operating potential 32. The input sinusoidal timing waveform is applied through a blocking capacitor 34 to the base of transistor 30. Capacitor 36 couples the emitter of transistor 30 to the base of transistor 22.

When transistor 30 is turned ON during negative half-cycles of the input timing signal, the capacitor 36 is charged through a circuit including diode 25. When transistor 30 is turned OFF on alternate half-cycles of the input wave, the delay line 20 is charged from capacitor 36 through the bypass diode 24. In the same manner discussed in conjunction with the embodiments shown in FIGS. 1 and 3, the transistor delay cable 20 is periodically discharged through the transistor 22 to generate an output pulse having a duration or "width" equal to two times the cable's delay time.

It is to be understood that the embodiments of the invention which have been described are merely illustrative of an application of the principles of the invention. Numerous modifications may be made by those skilled in the art without departing from the true spirit and scope of the invention.

What is claimed is:

1. A pulse generator comprising a two terminal source of an electrical waveform which manifests a shift from a first voltage level to a second voltage level, a transistor having base, collector, and emitter electrodes, circuit means connecting said base electrode to a first terminal of said source, a capacitive storage network connected between said emitter electrode and the second terminal of said source, a load circuit connected between said collector electrode and said second source terminal, and a bypass circuit connected between said base and emitter electrodes so that said capacitive network is charged through said bypass circuit when said waveform is at said first voltage level and is discharged through said load circuit when said waveform shifts to said second voltage level.

2. Apparatus as set forth in claim 1 wherein said bypass circuit includes a unidirectional conducting device poled in a direction appropriate for presenting a low impedance to the flow of charging current to said capacitive network.

3. Apparatus as set forth in claim 2 wherein said capacitive network comprises a delay network.

4. A pulse generator as in claim 1 wherein a source of electric potential is connected in series with said load circuit between said collector electrode and said second source terminal.

5. A pulse generator as in claim 1 wherein the waveform of said source is electrically clamped to one of said source terminals so that said second voltage level is substantially zero.

References Cited by the Examiner

UNITED STATES PATENTS

| | | | |
|---|---|---|---|
| 2,686,263 | 8/1954 | Konick | 328—32 |
| 2,739,233 | 3/1956 | Clayton | 328—67 X |
| 3,207,923 | 9/1965 | Prager | 307—88.5 |

ARTHUR GAUSS, *Primary Examiner.*

J. ZAZWORSKY, *Assistant Examiner.*